(12) United States Patent
Kinoshita (10) Patent No.: US 10,708,816 B2
(45) Date of Patent: Jul. 7, 2020

(54) COMMUNICATION APPARATUS, COMMUNICATION METHOD, AND NON-TRANSITORY COMPUTER-READABLE STORAGE MEDIUM FOR PERFORMING PACKETIZATION PROCESSING THAT DOES NOT DEPEND ON A NETWORK INTERFACE

(71) Applicant: CANON KABUSHIKI KAISHA, Tokyo (JP)

(72) Inventor: Akihisa Kinoshita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/983,781

(22) Filed: May 18, 2018

(65) Prior Publication Data
US 2018/0338267 A1 Nov. 22, 2018

(30) Foreign Application Priority Data
May 19, 2017 (JP) .................................. 2017-100075

(51) Int. Cl.
*H04W 28/06* (2009.01)
*H04L 29/06* (2006.01)

(52) U.S. Cl.
CPC .......... *H04W 28/065* (2013.01); *H04L 63/20* (2013.01); *H04L 69/161* (2013.01); *H04L 69/22* (2013.01)

(58) Field of Classification Search
CPC ..... H04L 1/0007; H04L 47/10; H04L 47/193; H04L 47/27; H04L 47/365; H04L 69/16; H04L 69/163; H04L 69/166; H04L 69/161
See application file for complete search history.

(56) References Cited

U.S. PATENT DOCUMENTS

| | | | | |
|---|---|---|---|---|
| 6,526,446 B1* | 2/2003 | Yang | ........................ | H04L 29/06 709/230 |
| 6,567,859 B1* | 5/2003 | Yang | ........................ | H04L 47/36 709/225 |
| 2001/0015956 A1* | 8/2001 | Ono | ........................ | H04L 1/0007 370/229 |
| 2002/0141448 A1* | 10/2002 | Matsunaga | ............. | H04L 29/06 370/469 |

(Continued)

FOREIGN PATENT DOCUMENTS

JP 5517951 B2 6/2014

*Primary Examiner* — Hoang-Chuong Q Vu (74) *Attorney, Agent, or Firm* — Carter, DeLuca & Farrell LLP (57) ABSTRACT

A communication apparatus comprises a generator configured to generate a header by a first method, and one or more computers for causing the apparatus to: obtain information of a window size from a communication partner apparatus; decide, based on the obtained information of the window size, a data size for a case of transmitting data to the communication partner apparatus; and if the decided data size exceeds a predetermined size, cause the generator to generate, by a first method, a header for data to be transmitted to the communication partner apparatus, and if the decided data size does not exceed the predetermined size, generate, by a second method different to the first method, a header for the data to be transmitted to the communication partner apparatus.

14 Claims, 6 Drawing Sheets

(56) References Cited

U.S. PATENT DOCUMENTS

| | | | |
|---|---|---|---|
| 2003/0147390 A1* | 8/2003 | Rizzo | H04L 12/185 370/390 |
| 2005/0083917 A1* | 4/2005 | Okamoto | H04L 29/06 370/352 |
| 2007/0025374 A1* | 2/2007 | Stefan | H04L 63/0227 370/401 |
| 2007/0025395 A1* | 2/2007 | Cardona | H04L 69/16 370/474 |
| 2007/0223483 A1* | 9/2007 | Huang | H04L 47/10 370/394 |
| 2008/0101357 A1* | 5/2008 | Iovanna | H04L 29/12009 370/389 |
| 2010/0135324 A1* | 6/2010 | Pope | H04L 69/16 370/474 |
| 2011/0099437 A1* | 4/2011 | Ramakrishnan | H04L 1/0007 714/704 |
| 2012/0243410 A1* | 9/2012 | Vedula | H04L 41/5025 370/235 |
| 2013/0059527 A1* | 3/2013 | Hasesaka | H04L 12/66 455/7 |
| 2013/0136136 A1* | 5/2013 | Ando | H04L 12/54 370/395.1 |
| 2015/0381752 A1* | 12/2015 | Torres | H04L 67/28 709/228 |
| 2016/0057070 A1* | 2/2016 | Saxena | H04L 47/365 370/392 |
| 2016/0112900 A1* | 4/2016 | Bai | H04L 1/0007 370/392 |
| 2017/0070441 A1* | 3/2017 | Lee | H04L 47/365 |

* cited by examiner

COMMUNICATION APPARATUS, COMMUNICATION METHOD, AND NON-TRANSITORY COMPUTER-READABLE STORAGE MEDIUM FOR PERFORMING PACKETIZATION PROCESSING THAT DOES NOT DEPEND ON A NETWORK INTERFACE

BACKGROUND OF THE INVENTION

Field of the Invention

The present invention relates to a communication apparatus, a communication method, and a non-transitory computer-readable storage medium.

Description of the Related Art

In packet communication, a communication method that uses an acknowledgement referred to as an ACK is conventionally used by a receiving side that receives a packet transmitted from a transmitting side in order to guarantee reliability of communication. For example, in TCP/IP (Transmission Control Protocol/Internet Protocol) which is widely used in Internet communication, a transmitting side packetizes transmission data by dividing it into segments and transmitting it, and a receiving side needs to manage the segments by a sequence number in units of octets, and respond with a sequence number for a received segment as an ACK.

In TCP/IP protocol processing, the transmitting side prepares a network buffer for packetizing communication data or retransmission processing. In processing for transmitting TCP/IP packets on the transmitting side, user data designated by a socket API send( ) is transferred to the network buffer, and divided into MTUs (maximum transmission unit). Checksums for divided data and a pseudo header are calculated, and a TCP header and an IP header are added thereto so that a TCP/IP packet is generated. In addition to these headers, in the case where a transmission route is Ethernet (registered trademark), an Ethernet frame where an Ethernet header is added is generated and transmitted.

In addition, in TCP/IP protocol processing, window control which uses a predetermined window size is performed in order to avoid a reduction of a communication rate due to the receiving side transmitting an ACK for each packet transmission by the transmitting side. In TCP/IP window control, the receiving side transmits an ACK in which a remaining size of a reception buffer is set to a window size, and the transmitting side can transmit transmission data without waiting for an ACK until the window size is reached. Furthermore, in TCP/IP window control, a sliding window is used in order to further improve the communication rate. In the sliding window, the receiving side transmits an ACK each time a packet is received, and the transmitting side, upon receiving an initial ACK, can slide the window to consecutively transmit the window size worth of data without waiting for an ACK.

In recent years, in TCP/IP protocol processing, in order to reduce processing by a CPU (Central Processing Unit) and to achieve high-speed transmission, techniques for performing transmission data segment division processing and IP packetization processing for divided segments by hardware at a network I/F have been used. Such techniques are realized by a TSO (TCP Segmentation Offload) function (refer to Japanese Patent No. 5517951). Typically the TSO function is implemented by hardware such as a NIC (Network Interface Card). By using a TSO function, instead of transmitting application data in conventional MSS (Maximum Segment Size) units, it is possible to make a request to hardware to transmit the application data in data units larger than the MSS, and have the hardware redivide the application data into MSS units and consecutively transmit it on the network.

However, in the case of using multiple IFs (simultaneous use of a wired LAN and a wireless LAN), there is a network I/F that supports a TSO function and an IF that does not support the TSO function, and a network stack needs to change processing for each IF.

SUMMARY OF THE INVENTION

In light of the foregoing problem, the present disclosure provides a technique for performing packetization processing that does not depend on a network I/F.

According to one aspect of the present invention, there is provided a communication apparatus which comprises: a generator configured to generate a header by a first method; and one or more computers for causing the apparatus to: obtain information of a window size from a communication partner apparatus; decide, based on the obtained information of the window size, a data size for a case of transmitting data to the communication partner apparatus; and if the decided data size exceeds a predetermined size, cause the generator to generate, by a first method, a header for data to be transmitted to the communication partner apparatus, and if the decided data size does not exceed the predetermined size, generate, by a second method different to the first method, a header for the data to be transmitted to the communication partner apparatus.

Further features of the present invention will become apparent from the following description of exemplary embodiments (with reference to the attached drawings).

DESCRIPTION OF THE EMBODIMENTS

Below, with reference to the attached drawings, a detailed explanation is given for the present invention based on preferred embodiments. Note that configurations illustrated in the following embodiments are merely examples, and the present invention is not limited to the illustrated configurations.

First Embodiment

Figure 1:
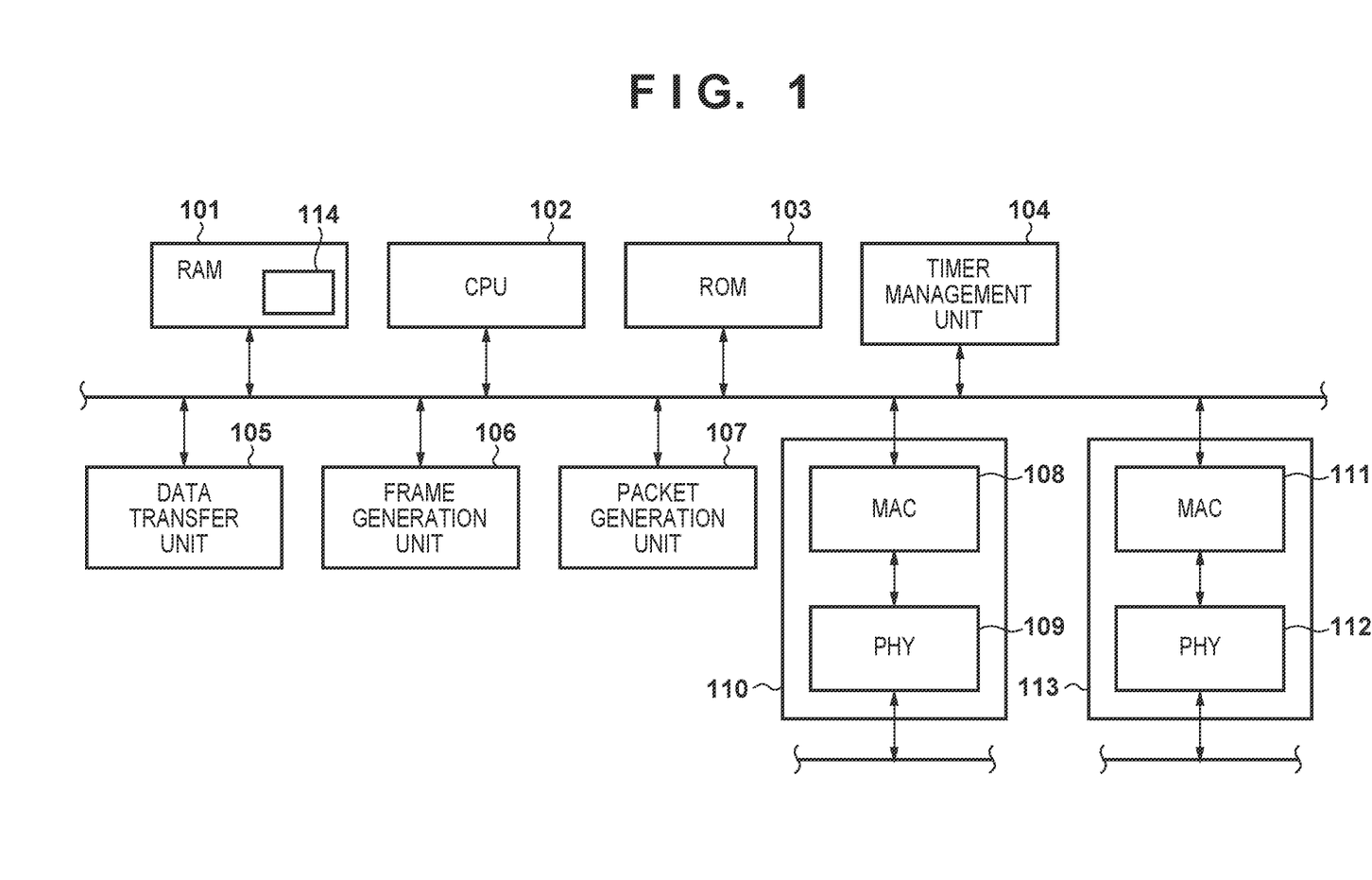
FIG. 1 is a block diagram that illustrates an example of a hardware configuration of a communication apparatus according to an embodiment.

FIG. 1 is a block diagram that illustrates an example of a hardware configuration of a communication apparatus 10 in a first embodiment. An RAM (Random Access Memory) 101 is used to save various data and as a work memory. The RAM 101 has a transmission buffer 114 for storing and managing transmission data. A ROM (Read Only Memory) 103 stores, for example, various programs that are executed by a CPU 102. With the RAM 101 as a work memory, the CPU 102 executes various programs stored in a recording medium as a program storage unit, such as the ROM 103 or a hard disk (not shown).

A first communication unit 110 has a MAC (Media Access Control) module 108 and a PHY (Physical Layer) module 109, and performs communication with a communication partner apparatus via a network such as Ethernet (registered trademark). Similarly, a second communication unit 113 has an MAC module 111 and a PHY module 112, and performs communication with the communication partner apparatus via a network different to that for the first communication unit 110. Transmission and reception of data is performed in accordance with the MAC module 108 (and/or the MAC module 111) being controlled in accordance with the CPU 102 executing a network driver. Note that, in the present embodiment, it is assumed that the first communication unit 110 and the second communication unit 113 perform communication via Ethernet (registered trademark), but it is possible to perform communication via a medium that enables IP communication, such as a wireless LAN (Wi-Fi), instead of this.

The above configuration is similar to a normal communication apparatus, but the communication apparatus 10 in the present embodiment further has a data transfer unit 105, a frame generation unit 106, and a packet generation unit 107. The data transfer unit 105 is configured in accordance with DMA (Direct Memory Access), for example, and transfers data stored in the RAM 101 to the frame generation unit 106 or the packet generation unit 107. The data transfer unit 105 may be subject to transfer control by the CPU 102. The frame generation unit 106 decides a transmission data size to transmit, and performs header information generation processing for generating transmission data of the decided size and header information for the transmission data. The packet generation unit 107, based on the transmission data and the header information generated by the frame generation unit 106, segmentizes the transmission data and generates a header, and generates a transmission packet from the segment and header. A timer management unit 104 manages a predetermined amount of time necessary in relation to packet transmission. Note that a (transmission) packet described below is a unit of data transmitted or received in IP communication. Because a method of assembling packets is not the essence of the present embodiment, it is omitted.

Figure 2:
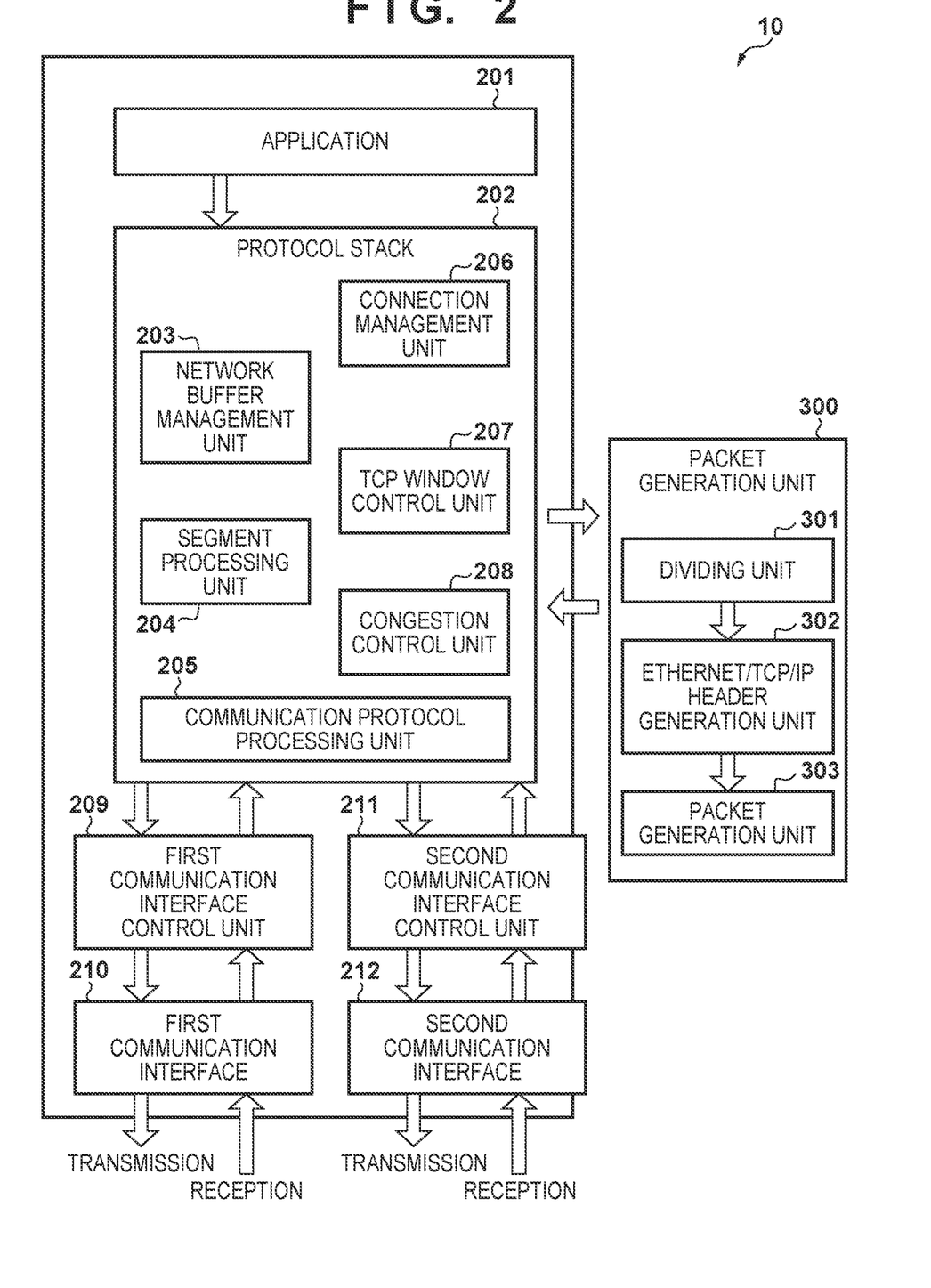
FIG. 2 is a block diagram that illustrates an example of a functional configuration of a communication apparatus according to an embodiment.

FIG. 2 is a block diagram that illustrates an example of a functional configuration of the communication apparatus 10 in the present embodiment. An application 201 indicates a user application. Application data to be transmitted (transmission data) which is of any size is inputted to a protocol stack 202 by the application 201. The protocol stack 202 is configured by a network buffer management unit 203, a segment processing unit 204, a communication protocol processing unit 205, a connection management unit 206, a TCP window control unit 207, and a congestion control unit 208.

The network buffer management unit 203 stores and manages transmission data inputted from the application 201 in the transmission buffer 114 of the RAM 101. The network buffer management unit 203 also manages the size of transmission data stored in the transmission buffer 114. The connection management unit 206 manages a communication connection for the communication apparatus 10. For example, the connection management unit 206 manages connection information such as a MSS (Maximum Segment Size) in a communication connection (for example, a TCP connection) established between the application 201 and a communication partner apparatus. The TCP window control unit 207 obtains and manages a transmission window size for a TCP connection from acknowledgements received via a first communication interface control unit 209 and a second communication interface control unit 211. The congestion control unit 208 manages congestion control in a TCP connection. For example, the congestion control unit 208 manages a congestion window in a TCP connection established by the application 201 with a communication partner apparatus.

The segment processing unit 204 decides the transmission data size based on a congestion window size managed by the congestion control unit 208, a transmission window size managed by the TCP window control unit 207, the MSS managed by the connection management unit 206, the size of transmission data stored in the transmission buffer 114 in the RAM 101 that is managed by the network buffer management unit 203, and the like. The communication protocol processing unit 205 generates, as a transmission packet, an IP header and a TCP header for a TCP segment, and performs processing such as a checksum calculation associated therewith.

A packet generation unit 300 corresponds to the packet generation unit 107 of FIG. 1, and is configured from a dividing unit 301, an Ethernet/TCP/IP header generation unit 302, and a packet generation unit 303. The dividing unit 301 divides transmission data into predetermined units (for example, MSS units). The Ethernet/TCP/IP header generation unit 302 generates a TCP/IP header and an Ethernet header based on predetermined header information. The packet generation unit 303 performs packetization processing on data outputted from the dividing unit 301 and the Ethernet/TCP/IP header generation unit 302.

In the present embodiment, in accordance with the transmission data size decided by the segment processing unit 204, the communication protocol processing unit 205 or the packet generation unit 300 generates a transmission packet. A method of generating a transmission packet is described later using FIGS. 3A and 3B.

A transmission packet generated by the communication protocol processing unit 205 or the packet generation unit 300 is inputted to the first communication interface control unit 209 or the second communication interface control unit 211 in accordance with a transmission destination. The first communication interface control unit 209 is responsible for exchange of information or data between the protocol stack 202 and a first communication interface 210. Similarly, the second communication interface control unit 211 is responsible for exchange of information or data between the protocol stack 202 and a second communication interface 212. The first communication interface 210 and the second communication interface 212 correspond to the MAC module 108 and the PHY module 109, as well as the MAC module 111 and the PHY module 112 in FIG. 1, and are connected to the network. Transmission of a transmission packet may be performed in a case of being informed by the timer management unit 104 that a certain amount of time or more has elapsed.

Figure 3A:
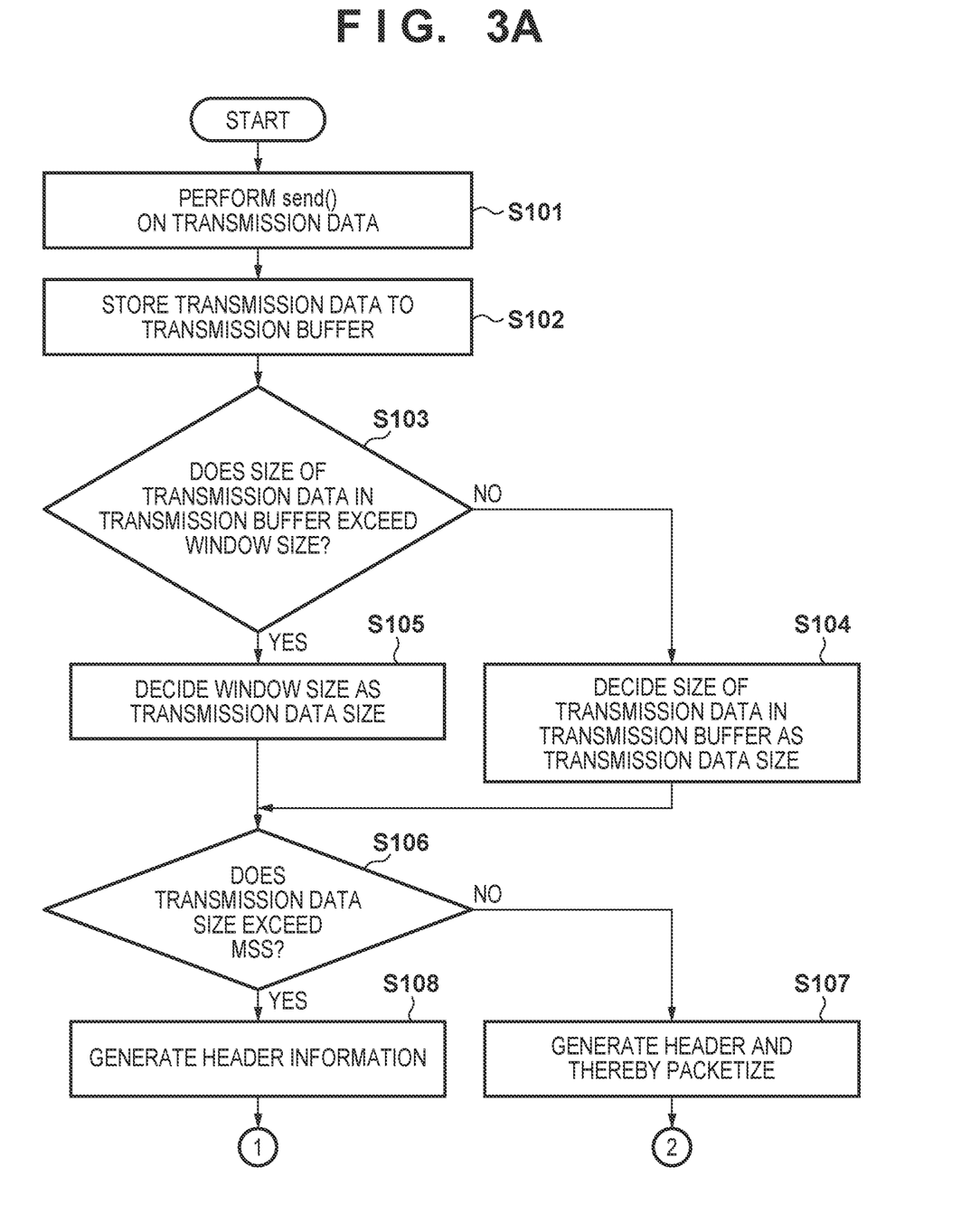
FIGS. 3A and 3B are a flowchart that illustrates processing according to a first embodiment.
Figure 3B:
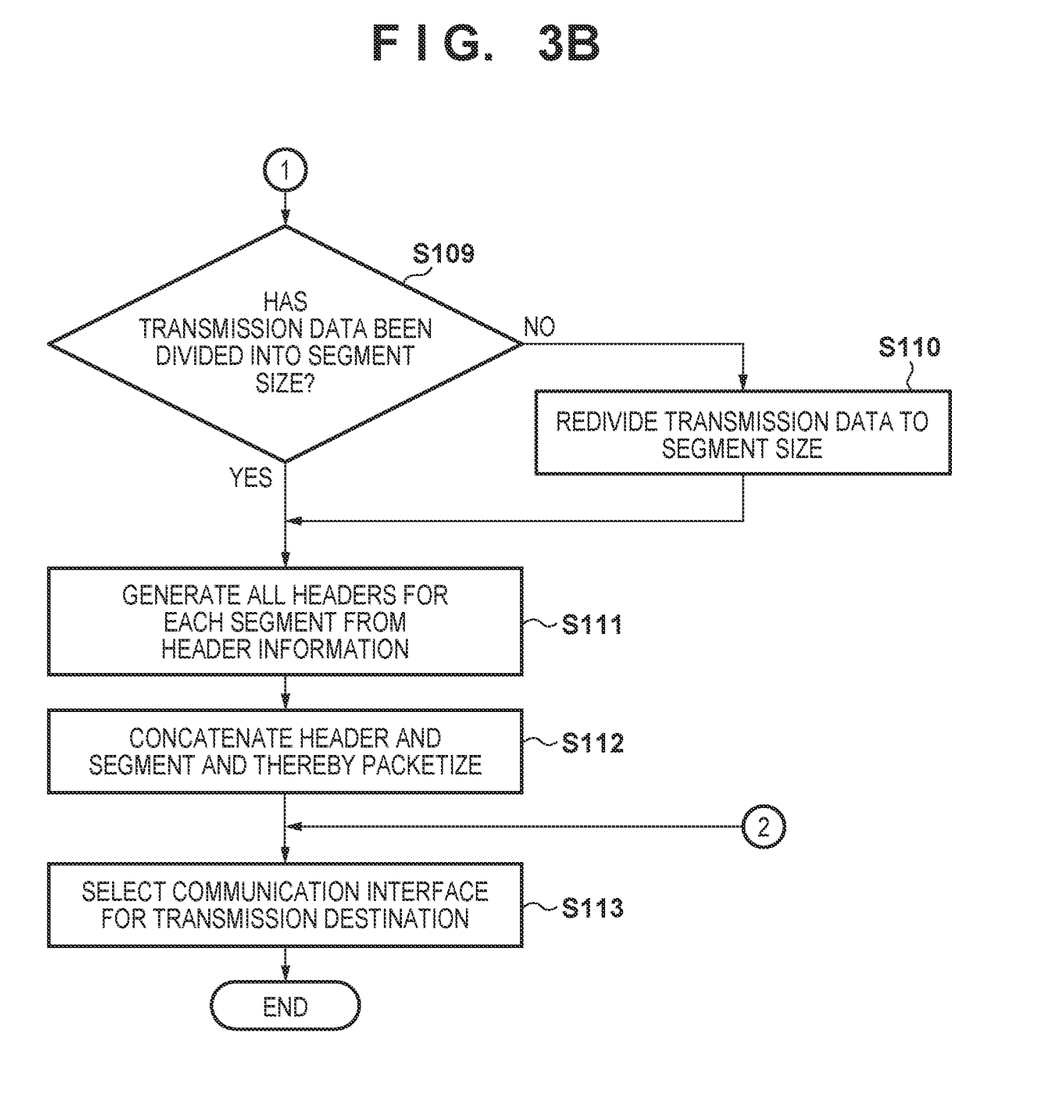

Next, with reference to FIGS. 3A and 3B, description is given regarding processing in the present embodiment. FIGS. 3A and 3B are flowcharts for describing data transmission processing in the present embodiment. For this flowchart, data transmission processing by a socket API send( ) is envisioned.

Firstly, in step S101, in response to a predetermined program that is stored in the ROM 103 being executed by the CPU 102, the application 201 calls send( ). When send( ) is called, the data transfer unit 105, in step S102, transfers the transmission data to the transmission buffer 114 in the RAM 101 which is the data transfer destination of a user buffer (not shown). At the time of the transfer, the data transfer unit 105 may divide the data into MSS units and then store it in the transmission buffer 114.

In step S103, the segment processing unit 204 determines whether the size of the transmission data stored in the transmission buffer 114 exceeds the transmission window size which is managed by the TCP window control unit 207. When the transmission window size exceeds the size of transmission data stored in the transmission buffer 114 (Yes in step S103), the processing proceeds to step S104, and the segment processing unit 204 decides the size of transmission data stored in the transmission buffer 114 as the transmission data size. Meanwhile, when the transmission window size is less than or equal to the size of transmission data stored in the transmission buffer 114 (No in step S103), the processing proceeds to step S105, and the segment processing unit 204 decides the transmission window size as the transmission data size.

In step S106, the communication protocol processing unit 205 determines whether the transmission data size decided in step S105 or step S104 exceeds the MSS which is managed by the connection management unit 206. If the decided transmission data size is less than or equal to the MSS (No in step S106), the processing proceeds to step S107. In step S107, the communication protocol processing unit 205 controls the packet generation unit 107 to calculate a checksum and generate a TCP/IP header, and uses the TCP/IP header to packetize the transmission data, and generate a TCP/IP packet. The communication protocol processing unit 205 also generates an Ethernet header, and uses the generated Ethernet header to wrap the generated TCP/IP packet in an Ethernet frame, and advances to step S113.

Meanwhile, if the decided transmission data size exceeds the MSS (Yes in step S106), the processing proceeds to step S108. In step S108, the frame generation unit 106 generates header information as information for generating the TCP/IP header and the Ethernet header, and then proceeds to step S109. Step S109 through step S112 is processing by the packet generation unit 300 which corresponds to the packet generation unit 107. In step S109, the dividing unit 301 determines whether the transmission data has been divided into MSS units, and if the transmission data has not been divided into MSS units (No in step S109), the processing proceeds to step S110. In step S110, the dividing unit 301 redivides transmission data into MSS units, and the processing proceeds to step S111. If the transmission data is divided into MSS units (Yes in step S109), the processing proceeds to step S111. In step S111, the Ethernet/TCP/IP header generation unit 302 uses the header information generated in step S108 to (automatically) generate a TCP/IP header and an Ethernet header for each segment resulting from the transmission data being divided into MSS units. In step S112, the packet generation unit 303 concatenates a TCP/IP header generated in step S111 with a segment to make a TCP/IP packet, and then adds an Ethernet header to generate an Ethernet frame. Note that a number of segments that can be concatenated at once can be decided based on the congestion window size.

In step S113, the communication protocol processing unit 205 selects a communication interface that is a transmission destination, transmits the Ethernet frame to the first communication interface control unit 209 or the second communication interface control unit 211, and ends processing.

In this way, it is possible to use processing (the processing of step S109 through step S112) by hardware to implement segment division of transmission data, generation of TCP/IP headers, and generation of Ethernet frames, without depending of the communication interface. Note that it is possible to apply the present embodiment even in the case where the processing by the hardware that is executed is made to be processing by software.

Note that configuration may be taken such that, when the data transfer unit 105 transfers the transmission data to the transmission buffer 114 in step S102, in a case where the transmission data can be divided into MSS units and stored in the transmission buffer 114, the communication protocol processing unit 205 performs a checksum calculation with respect to data in a MSS unit, holds the data and the checksum value as a pair, and in step S111, the Ethernet/TCP/IP header generation unit 302 uses the held checksum value to generate a TCP/IP header. In addition, an example in which there are a plurality of communication interfaces is given, but the present invention can be applied even in the case where there is one communication interface. In addition, in the present embodiment, description was given with the TCP/IP protocols as an example, but application of another protocol such as the UDP (User Datagram Protocol) protocol is also possible.

Second Embodiment

Next, description is given regarding a second embodiment. Note that, in the present embodiment, regarding configurations similar to those of the first embodiment, the same reference numerals are added, and a detailed description thereof is omitted.

Figure 4A:
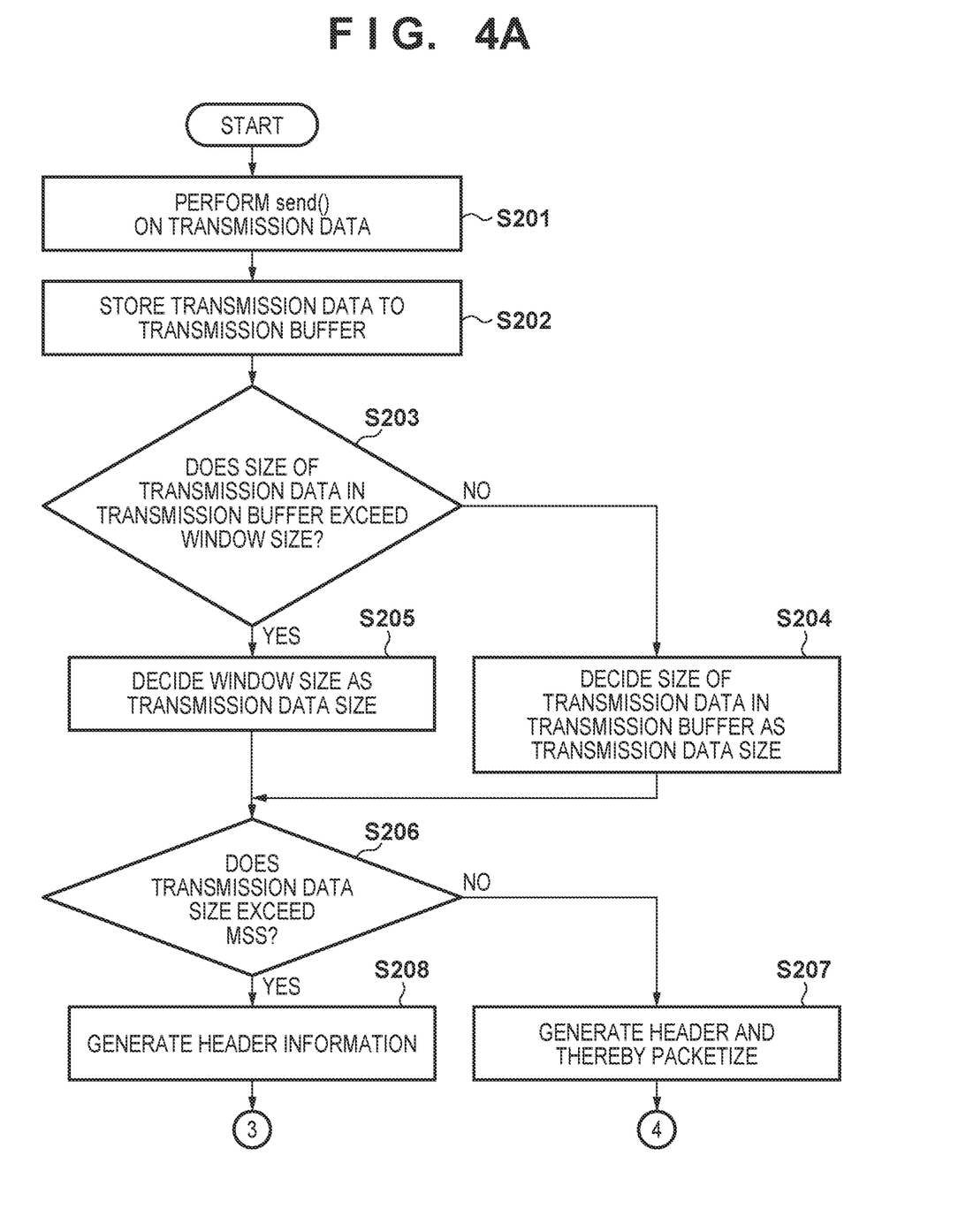
FIGS. 4A and 4B are a flowchart that illustrates processing according to a second embodiment.
Figure 4B:
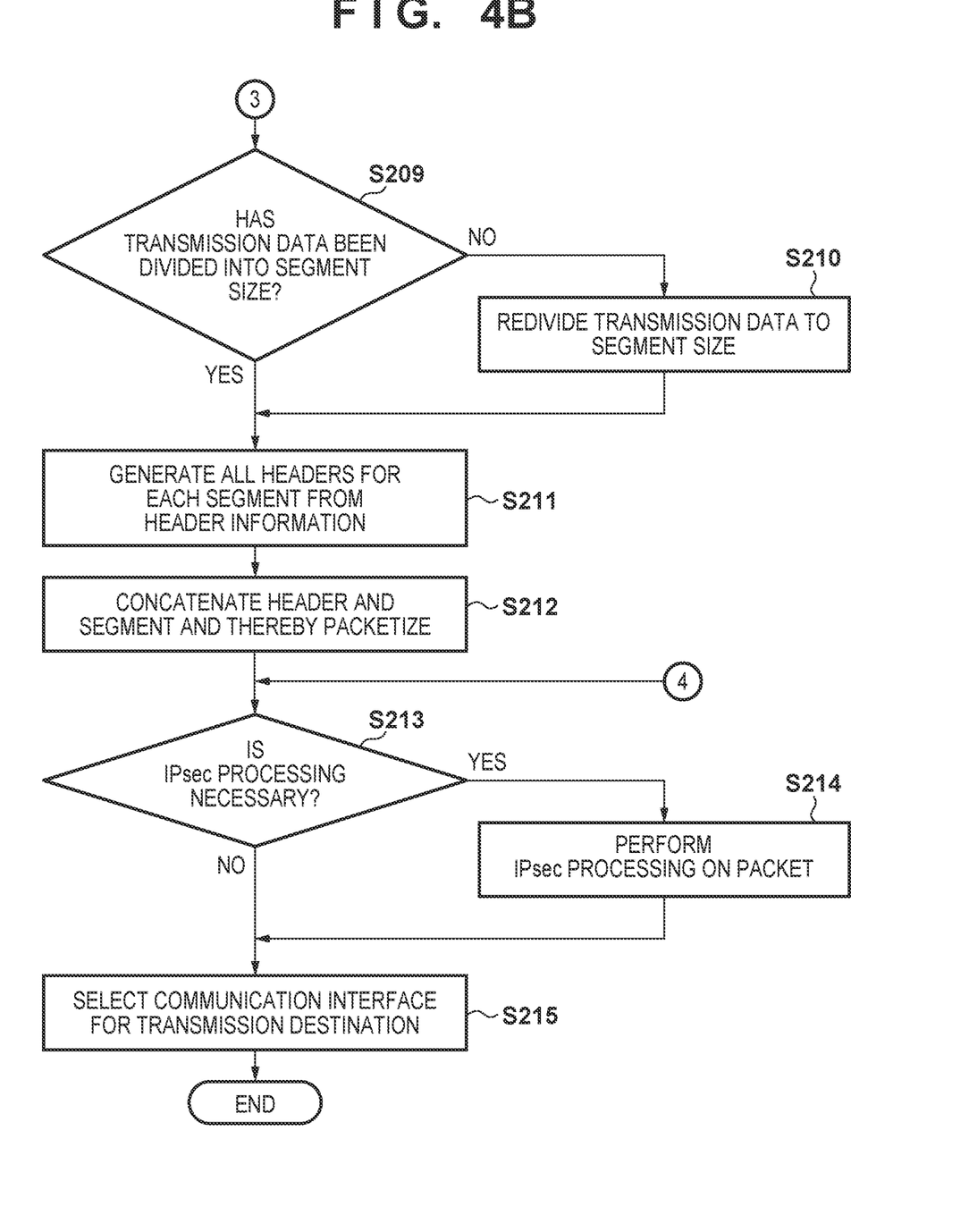

Next, with reference to FIGS. 4A and 4B, description is given regarding processing in the present embodiment. FIGS. 4A and 4B is a flowchart for describing data transmission processing in the present embodiment. For this flowchart, data transmission processing by a socket API send( ) is envisioned. Note that, because the processing of step S201 through step S212 is processing similar to that of step S101 through step S112 of FIG. 3B described in the first embodiment, description thereof is omitted.

In step S213, the communication protocol processing unit 205 determines whether IPsec processing as predetermined security processing is necessary for the TCP/IP packet. If IPsec processing is necessary (Yes in step S210), the processing proceeds to step S214. In step S214, the communication protocol processing unit 205 executes IPsec processing on the TCP/IP packet, and the processing proceeds to step S215. If IPsec processing is not necessary (No in step S210), the processing proceeds to step S215. In step S215, the communication protocol processing unit 205 selects a communication interface that is a transmission destination, transmits the Ethernet frame to the first communication interface control unit 209 or the second communication interface control unit 211, and ends processing.

In this way, it is possible to use processing (the processing of step S209 through step S212) by hardware to implement segment division of transmission data, generation of TCP/IP headers, and generation of Ethernet frames, without depending of the communication interface. Note that it is possible to apply the present embodiment even in the case where the processing by the hardware that is executed is made to be processing by software. In addition, in a case where IPsec communication with a communication partner apparatus is necessary, it is possible to perform IPsec processing on a transmission packet after the transmission packet is packetized.

Note that configuration may be taken such that, when the data transfer unit 105 transfers the transmission data to the transmission buffer 114 in step S202, in a case where the transmission data can be divided into MSS units and stored in the transmission buffer 114, the communication protocol processing unit 205 performs a checksum calculation with respect to data in an MSS unit, holds the data and the checksum value as a pair, and in step S211, the Ethernet/TCP/IP header generation unit 302 uses the held checksum value to generate a TCP/IP header. In addition, an example in which there are a plurality of communication interfaces is given, but the present invention can be applied even in the case where there is one communication interface. In addition, in the present embodiment, description was given with the TCP/IP protocols as an example, but application of another protocol such as the UDP (User Datagram Protocol) protocol is also possible.

In this way, by virtue of the embodiments described above, there is the advantage that a network stack, by performing "segment division" and "IP header/TCP header generation" for data at a layer lacking dependency on a network I/F, does not need to change processing for each network I/F. By virtue of the embodiments described above, in a case of retransmitting transmission data for which an acknowledgement could not be received, it is also possible to generate a header for the transmission data to be retransmitted, and have it be a transmission packet. In addition, by virtue of the embodiments described above, in accordance with a type of transmission data or a protocol type of transmission data, it is possible to switch whether to perform header generation and packetization of a transmission packet for transmission data, or perform packetization of a transmission packet after performing generation of header information necessary to generate a header.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-100075, filed May 19, 2017 which is hereby incorporated by reference herein in its entirety.

What is claimed is:

1. A communication apparatus comprising:
a generator configured to generate, by a first method, headers for a plurality of packets to be transmitted to a communication partner apparatus using common header information which is common to the packets; and
one or more computers for causing the apparatus to:
obtain information of a window size from the communication partner apparatus;
decide, based on the obtained information of the window size, a data size of transmitting data to the communication partner apparatus;
calculate a checksum of data to be transmitted to the communication partner apparatus in a case where a predetermined condition is satisfied;
generate the common header information and cause the generator to generate, by the first method, the headers for the packets to be transmitted to the communication partner apparatus using the generated common header information in a case where the decided data size exceeds a predetermined size,
wherein in a case where a checksum of data to be transmitted to the communication partner apparatus calculated by the one or more computers exists, the generator is caused to generate the headers using the checksum calculated by the one or more computers, and
wherein in a case where a checksum of data to be transmitted to the communication partner apparatus calculated by the one or more computers does not exist, the generator is caused to calculate a checksum of data to be transmitted to the communication partner apparatus and generate the headers using the checksum calculated by the generator; and
generate, by a second method different from the first method, a header for a packet to be transmitted to the communication partner apparatus without generating the common header information in a case where the decided data size does not exceed the predetermined size.

2. The communication apparatus according to claim 1, wherein
the generator generates, based on data to be transmitted to the communication partner apparatus and the headers generated by the first method, the packets to be transmitted to the communication partner apparatus.

3. The communication apparatus according to claim 2, further comprising:
a first interface configured to perform wired communication; and
a second interface configured to perform wireless communication, wherein the packets generated by the generator can be provided to both of the first interface and the second interface.

4. The communication apparatus according to claim 2, wherein
the generator, based on the predetermined size, divides the data to be transmitted to the communication partner apparatus, and generates the packets for each piece of the divided data.

5. The communication apparatus according to claim 1, wherein
the one or more computers generate, based on data to be transmitted to the communication partner apparatus and the header generated by the second method, a packet to be transmitted to the communication partner apparatus.

6. The communication apparatus according to claim 1, wherein
the one or more computers execute predetermined security processing with respect to the packets to be transmitted to the communication partner apparatus.

7. The communication apparatus according to claim 6, wherein
the predetermined security processing is processing for IPSec (Security Architecture for Internet Protocol).

8. The communication apparatus according to claim 1, wherein
the information of a window size is included in an acknowledgement which is a response to a packet transmitted from the communication apparatus to the communication partner apparatus.

9. The communication apparatus according to claim 1, wherein
the predetermined size is an MSS (Maximum Segment Size) in a communication connection with the communication partner apparatus.

10. The communication apparatus according to claim 1, wherein
the generator and the one or more computers generate a header in compliance with at least one of TCP (Transmission Control Protocol), UDP (User Datagram Protocol), IP (Internet Protocol), or Ethernet.

11. The communication apparatus according to claim 1, wherein
the generator and the one or more computers generate a TCP (Transmission Control Protocol) and IP (Internet Protocol) headers.

12. The communication apparatus according to claim 1, wherein the case where the predetermined condition is satisfied is a case where data to be transmitted to the communication partner apparatus is stored in a transmission buffer in units of MSS (Maximum Segment Size).

13. A communication method, comprising:
obtaining information of a window size from a communication partner apparatus;
deciding, based on the obtained information of the window size, a data size of transmitting data to the communication partner apparatus;
calculating a checksum of data to be transmitted to the communication partner apparatus in a case where a predetermined condition is satisfied;
generating common header information which is common to a plurality of packets to be transmitted to the communication partner apparatus and generating, by a first method, the headers for the packets to be transmitted to the communication partner apparatus using the generated common header information in a case where the decided data size exceeds a predetermined size,
wherein in a case where a checksum of data to be transmitted to the communication partner apparatus has been already calculated, the headers are generated by using the checksum, and
wherein in a case where a checksum of data to be transmitted to the communication partner apparatus has not been calculated, a checksum of data to be transmitted to the communication partner apparatus is calculated and the headers are generated by using the checksum; and
generating, by a second method different from the first method, a header for a packet to be transmitted to the communication partner apparatus without generating the common header information in a case where the decided data size does not exceed the predetermined size.

14. A non-transitory computer-readable storage medium storing a computer program for causing a computer to execute a communication method, the method comprising:
obtaining information of a window size from a communication partner apparatus;
deciding, based on the obtained information of the window size, a data size of transmitting data to the communication partner apparatus;
calculating a checksum of data to be transmitted to the communication partner apparatus in a case where a predetermined condition is satisfied;
generating common header information which is common to a plurality of packets to be transmitted to the communication partner apparatus and generating, by a first method, the headers for the packets to be transmitted to the communication partner apparatus using the generated common header information in a case where the decided data size exceeds a predetermined size,
wherein in a case where a checksum of data to be transmitted to the communication partner apparatus has been already calculated, the headers are generated by using the checksum, and
wherein in a case where a checksum of data to be transmitted to the communication partner apparatus has not been calculated, a checksum of data to be transmitted to the communication partner apparatus is calculated and the headers are generated by using the checksum; and
generating, by a second method different from the first method, a header for a packet to be transmitted to the communication partner apparatus without generating the common header information in a case where the decided data size does not exceed the predetermined size.

* * * * *